United States Patent [19]

Jacques et al.

[11] Patent Number: 4,915,200

[45] Date of Patent: Apr. 10, 1990

[54] AIRFRAME MOUNTED ACCESSORY DRIVE GEARBOX MANUAL DECOUPLER SYSTEM

[75] Inventors: David L. Jacques, Rockford; Neil L. Brown, Stillman Valley, both of Ill.

[73] Assignee: Sundstrand Corporation, Rockford, Ill.

[21] Appl. No.: 209,957

[22] Filed: Jun. 22, 1988

[51] Int. Cl.⁴ .................. F16D 11/00; F16D 23/14
[52] U.S. Cl. .................... 192/30 W; 74/527; 192/67 R; 192/114 R; 244/60
[58] Field of Search ............. 192/114 R, 30 W, 67 R; 74/527; 244/60

[56] References Cited

U.S. PATENT DOCUMENTS

| | | | |
|---|---|---|---|
| 2,180,154 | 11/1939 | Lenz | 192/114 R X |
| 3,039,317 | 6/1962 | Wilson | 74/11 |
| 3,214,998 | 11/1965 | Hall | 192/114 R X |
| 3,260,541 | 7/1966 | Sadler et al. | 74/11 X |
| 3,830,111 | 8/1974 | Travaglio | 74/15.4 |
| 4,116,313 | 9/1978 | Maucher | 192/3.63 |
| 4,349,092 | 9/1982 | Geisthoff | 192/67 R |
| 4,479,568 | 10/1984 | Palazzolo et al. | 192/114 R X |
| 4,684,000 | 8/1987 | Brown | 192/114 R X |
| 4,697,680 | 10/1987 | Faber | 192/114 R X |

FOREIGN PATENT DOCUMENTS 18024 11/1956 Fed. Rep. of Germany ... 192/114 R

Primary Examiner—Rodney H. Bonck
Attorney, Agent, or Firm—Antonelli, Terry & Wands

[57] ABSTRACT

In a jet aircraft having a drive which rotatably drives an airframe mounted accessory drive (12), a system for controlling the connection of the drive to the airframe mounted accessory drive is disclosed which permits the manual connection and disconnection of a rotatable shaft (18) from a driven shaft (22) with high reliability by a manually movable handle (30) which is connected to a fork (88) which is rotatable between first and second positions which translates a movable carrier (20) which carries the driven shaft between first and second positions. The system has minimal backlash which insures high integrity in sensed positions of the system which is necessary for safe operation of the aircraft. Furthermore, a safety interlock (44) is provided which is activated by pressurized hydraulic fluid from the airframe mounted accessory drive to prevent translation of the carrier (20) and the rotatable shaft (22) during operation of the aircraft or driving of the airframe mounted accessory drive by an auxiliary power unit (21) during testing of the on board generator (17) or hydraulic pump(s) (19).

16 Claims, 5 Drawing Sheets

AIRFRAME MOUNTED ACCESSORY DRIVE GEARBOX MANUAL DECOUPLER SYSTEM

TECHNICAL FIELD

The present invention relates to a system for permitting the manual decoupling of an airframe mounted accessory drive from a shaft driven by a turbine propulsive engine.

BACKGROUND ART

FIG. 1 illustrates a block diagram of a prior art system 10 for manually controlling the connection of an airframe mounted accessory drive (AMAD) 12 to a propulsion turbine 14 of a jet aircraft by means of an engine gearbox 13 and power takeoff (PTO) 15. This system is utilized in the F-18 jet aircraft to permit the selective connection and disconnection of the airframe mounted accessory drive 12 from the propulsive turbine engine 14 for purposes of testing the electrical generator 17 and hydraulic pump(s) 19 for producing on board power by a drive applied from an auxiliary power unit (APU) 21 with the engine gearbox 13 removed. The APU is conventionally used for starting of the propulsion engine 14 and may also drive the generator 17 and hydraulic pump(s) 19 in flight. The system 10 has a handle 23 which is attached to a coupling mechanism 25 which is axially movable between first and second positions at which the handle may be locked. In the first position, the airframe mounted accessory drive 12 is mechanically connected to the propulsion turbine 14 via engine gearbox 13 and PTO 15 and in the second position the airframe mounted accessory drive is disconnected from the propulsion turbine to permit drive by the APU 21 of the electrical generator 17 and hydraulic pump(s) 19. The handle is connected to a rack which engages a pinion gear which is connected to an acme screw within the coupling mechanism. Rotation of the acme screw controls the movement of a rotatable shaft within the coupling mechanism 25 between first and second positions at which the airframe mounted accessory drive 12 and propulsion turbine 14 are respectfully connected and disconnected from each other.

The prior art system has a number of disadvantages. In the first place, the coupling mechanism 25 including the acme screw and rack and pinion are expensive to manufacture. Furthermore, the rack and pinion drive coupled to the acme screw is characterized by substantial backlash which makes it difficult to monitor the precise position of the coupling mechanism 25 in the first and second positions which is essential for safe operation of the aircraft. It is of extreme importance that false readings are not possible in monitoring the position of the coupling mechanism 25 in the first and second positions for the reason that the inadvertent disconnection would prevent the airframe mounted accessory drive from being used to generate on board electrical and hydraulic power which is necessary for proper aircraft operation.

DISCLOSURE OF INVENTION

The present invention provides an improved coupling control mechanism and power takeoff for selectively connecting an airframe mounted accessory drive to a propulsion turbine which has minimal backlash, reduced manufacturing costs as compared to the prior art, provides reliable position indication of the coupling control mechanism in the first and second positions which respectively indicate that the airframe mounted accessory drive is connected to and disconnected from the propulsion turbine and positions intermediate thereof and an interlock with visual indication to prevent operation of the aircraft while the coupling control mechanism and power takeoff is in the second decoupled position while permitting determination of the position visually.

In a jet aircraft having a drive which rotatably drives an airframe mounted accessory drive a system for controlling the connection of the drive to the airframe accessory drive in accordance with the invention includes a movable member which is pivotal at a pivot point between first and second positions; a locking mechanism for locking the movable member in the first and second positions; an axially movable carrier which is movable between first and second positions, the movable carrier carrying a shaft which is positioned in first and second axial positions respectively when the carrier is in the first and second axial positions, the shaft having a first end which is coupled to the airframe mounted accessory drive and a second end which is connectable to a shaft driven by a propulsion turbine of the aircraft when the carrier is in the first axial position and decoupled from the airframe mounted accessory drive when the carrier is in the second axial position, the first position of the movable member corresponding to the first position of the carrier and the second position of the movable member corresponding to the second position of the carrier and rotation of the movable member between the first and second positions causing axial movement of the carrier from the first axial position to the second axial position and axial movement of the shaft from the first axial position to the second axial position; a rotatably mounted shaft which is connected to the movable member at the pivot point; and a fork having a first end which is connected to the rotatable mounted shaft and a second end which is connected to the carrier with rotation of the shaft causing the fork to rotate between first and second rotary positions which correspond to the first and second axial positions of the carrier. Further the invention includes a pump which is driven through the airframe mounted accessory drive to produce pressurized fluid in response to a rotational drive applied to the shaft; an axially movable member which is in fluid connection with the pump with the axially movable member being biased in a first position when pressurized fluid is not connected thereto and being positioned in a second position by pressurized fluid from the pump to lock the carrier in either the first or second position as long as the pressurized fluid is connected to the axially movable member. The carrier has first and second apertures respectively corresponding to the first and second positions of the carriage, when in the second position the axially movable member engaging either the first aperture when the carrier is locked in the first position or the second aperture when the carrier is locked in the second position to prevent shifting of the shaft carried by the carrier. The axially movable member comprises a cylindrical bore in a housing which projects inward toward the carrier; a piston disposed in the bore; a cover sealing an opening in the cylindrical bore; a fluid connection connecting pressurized fluid to the bore at a position outward from a top surface of the piston; and a spring disposed in the bore and engaging a bottom surface of the piston to position the axially movable member in the first position when the pressurized fluid is not connected to the bore. The piston is attached to a rod with the rod activating an indicator to signal that the shaft carried by the carrier is in the first or second position when pressurized fluid is connected to the cylindrical bore in the housing and not activating the indicating mechanism when pressurized fluid is not connected to the cylindrical bore in the housing. The indicator comprises a rod connected to the piston which engages a bore extending through the cover, the rod being disposed below a top surface of the cover when pressurized fluid is not connected to the cylindrical bore in the housing and projecting above the top surface of the cover when pressurized fluid is connected to the cylindrical bore in the housing.

A position detector is provided for detecting the first and second positions of the movable member and signalling when the movable member is in the first position, is at an intermediate position, and is in the second position. The position detector includes a first switch mounted adjacent the first position of the movable member which engages the movable member when the movable member is in the first position to cause the first switch to be in a first conductivity state and is in a second conductivity state when the movable member is not in the first position; a second switch mounted adjacent the second position of the movable member which engages the movable member when the movable member is in the second position to cause the second switch to be in a first conductivity state and is in a second conductivity state when the movable member is not in the second position. The first conductivity state of the first and second switches permits electrical current to flow between terminals of the switches and the second conductivity state of the switches blocks the flow of electrical current through the terminals of the switches. The intermediate position is signalled by both switches being in the second conductivity state.

The mechanism for locking the movable member in the first and second positions comprises an opening which engages the movable member to permit pivoting of the movable member between the first and second positions, the opening having two sections which are connected by a connecting section, the two sections having a dimension parallel to a width of the connecting section which is greater than the width; and a handle mounted on the movable member which is axially movable between a first position at which the handle is biased to a second position, the first position of the handle engaging one of the two sections of the opening when the movable member is in one of the first and second positions of the movable member to lock the movable member from rotation to the other of the first and second positions of the movable member, the second position of the movable member permitting rotation of a movable member between the first and second positions of the movable member.

In a jet aircraft having a driven shaft which is connected to a rotatable shaft with the connection being subject to fretting upon the driven shaft applying power to the rotatable shaft to drive an airframe accessory drive, a lubrication system for the connection of the driven shaft to the rotatable shaft in accordance with the invention includes an oil supply for providing lubricating oil flowing axially with respect to the rotatable shaft and radially outward from the rotatable shaft to the connection of the driven shaft to the rotatable shaft; the rotatable shaft having an end defining an annulus; an end of the driven shaft being located within the annulus and being connected to the end of the rotatable shaft defining the annulus; an annular ring engaging an outside surface of the driven shaft, the end of the rotatable shaft and extending radially outward past the annulus to define a volume for retaining the lubricating oil in contact with the connection of the rotatable shaft and the driven shaft; and a spring biasing the annular ring axially against the end of the rotatable shaft to cause oil to be retained in the volume under pressure upon rotation of the rotatable shaft. The spring comprises a wave spring having a front surface which engages the annular ring and a rear surface which engages a radial projection extending outward from the driven shaft.

BEST MODE FOR CARRYING OUT THE INVENTION

Figure 1:
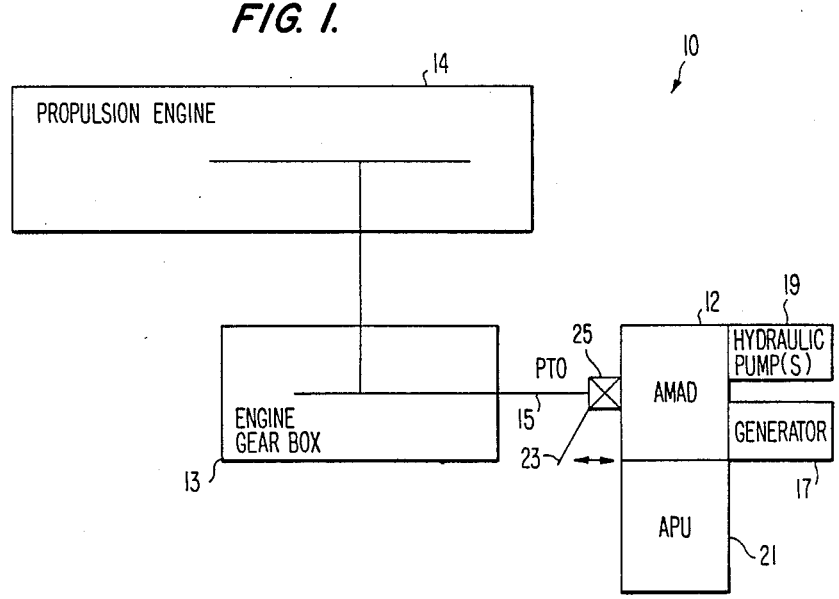
FIG. 1 illustrates a prior art system for manually controlling the connection of an airframe mounted accessary drive to a propulsion engine.
Figure 2A:
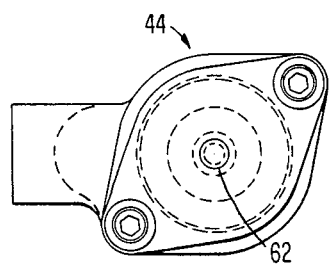
FIG. 2A illustrates a fragmentary top view of the present invention.
Figure 2:
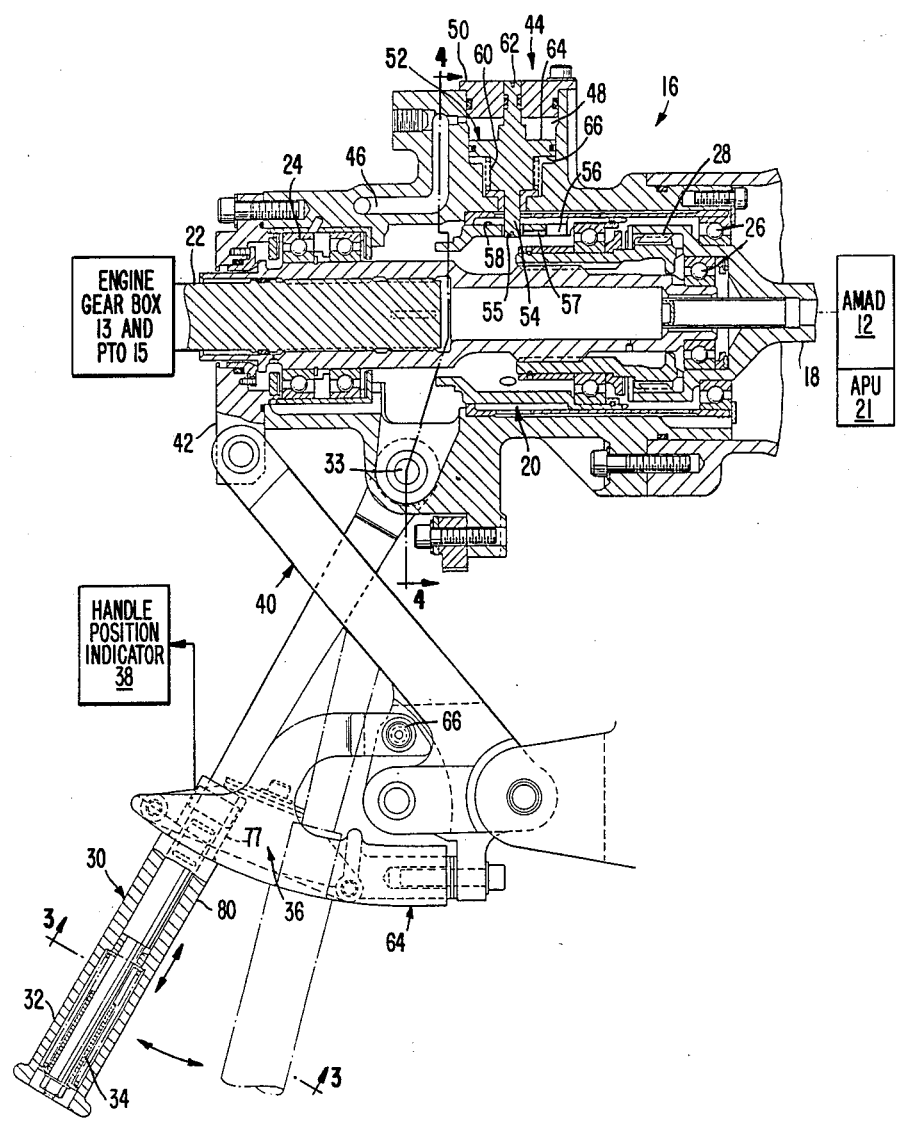
FIG. 2 illustrates a sectional view of the present invention.

FIG. 2 illustrates a side elevational view of the present invention. The invention provides a manual control mechanism 16 for selectively coupling a rotatable shaft 18 which is powered by a propulsion turbine (not illustrated) through gearbox 13, PTO 15 and driven shaft 22 to an airframe mounted accessory drive 12 driving one or more hydraulic pumps and a generator used for generating on board electrical and hydraulic power of conventional construction which have been omitted from illustration. The control mechanism 16 has first and second locked positions which respectively position a movable carrier 20 in first and second axial positions. The movable carrier 20 carries driven shaft 22 which is rotatably supported by bearing 24 and inner and outer bearings 26 respectively. A mechanical connection 28 joins the rotatable shaft 18 to the driven shaft 22 which is a splined joint. As will be described below with respect to FIG. 6, a lubrication system maintains the splined joint of the mechanical connection 28 under pressurized oil to prevent fretting as a consequence of power being applied from shaft 22 to shaft 18 in combination with high rotational speeds which can be 16,000 revolutions per minute or more. A handle 30 is pivotally attached to a shaft 33 which rotates a fork 88 (illustrated in FIGS. 4 and 5) for translating the movable carrier 20 and driven shaft 22 between first and second positions which respectively correspond to the clockwise and counterclockwise positions as illustrated. The first position of the handle 30 causes the driven shaft 22 to be positioned with full engagement of the splined joint of the mechanical contact 28 between the rotatable shaft 18 and the driven shaft 22. The second position causes the driven shaft 22 to be moved to the left to disengage the splined joint of mechanical connection 28 which is used for ground maintenance to test the on board power generation units by power applied by the APU 21.

The handle 30 has an outer cylindrical section 32 which is biased axially toward shaft 33 at the position as illustrated by spring 34. The outer cylindrical section 32 may be moved axially outward away from the shaft 33 against the bias of the spring 34 to withdraw the outer cylindrical section from a locked position as discussed below with reference to FIG. 3. When the outer cylindrical section 32 is withdrawn, the handle 30 may be rotated between its first and second positions to cause axial movement of the movable carriage 20 and driven shaft 22 as a consequence of rotation of shaft 33 and fork 88 as described below. A locking mechanism 36 and position sensor functions to retain the handle 30 in first and second locked positions and to further generate signals which are transmitted to a handle position indicator 38 to signal positions of the handle which include the first locked position at which the driven shaft 22 is connected to the rotatable shaft 18, the second locked position at which the driven shaft 22 is decoupled from the rotatable shaft 18 and an unlocked position which corresponds to the position of the handle intermediate between the first and second locked positions. The handle position indicator 38 may be located in the cockpit of the aircraft to permit the pilot to determine the position of the handle including the first, second and intermediate positions. The first position is the only position at which the aircraft should be operated to avoid loss of on board power being generated by the airframe mounted accessory drive 12. Suitable support brackets 40 structurally support the handle locking mechanism 36 and position sensor 36 by connection to the housing 42.

A hydraulically powered safety interlock 44 functions to retain the movable carrier 20 and driven shaft 22 either in the first locked position as illustrated in FIG. 2 when the driven shaft 22 is driving the rotatable shaft 18 or in the second locked position with the rotatable shaft decoupled from the driven shaft with power being applied to the AMAD 12 by the AP 21. Pressurized oil is applied from a pump (not illustrated) within the AMAD 12 by fluid connection 46 (partially illustrated) to a cylindrical bore 48 which extends radially inward toward the rotatable shaft 22 which causes a rod 54 to project into a first aperture 55 to lock the carrier in the first position, as illustrated, or into a second aperture 56 to lock the carrier in the second position. A cover plate 50 seals the cylindrical bore 48 to the applied pressurized fluid conducted by the fluid connection 46 from the pump within the airframe mounted accessory drive 12. A piston 52 is slidably mounted within the bore 48. The piston carries the radially inward extending rod 54. The rod 54 extends through the wall of the housing into an annular bore within the housing within which the movable carrier 20 slides between the first and second axial positions. The first locked position of the carrier 20 is established by operation of the aircraft with power being applied from the propulsion engine (not illustrated) through engine gearbox 13, shafts 22 and 18, to the AMAD 12 which causes the fluid pump associated with the AMAD to apply pressurized fluid through fluid connection 46 to position the rod 54 radially inward into aperture 55. The second locked position of the carrier 20, at which the shaft 22 is decoupled from shaft 18, occurs when the APU 21 applies power to the AMAD which causes the pump to apply pressurized fluid through fluid connection 46 to position the rod 54 radially inward into aperture 56. As illustrated, the movable carrier 20 and driven shaft 22 are in the first position and are locked against axial movement to the left to the second position by the projection of the rod 54 into the aperture 55. A spring 60 biases the piston 52 into a first position (not illustrated) when pressurized fluid is not applied from the fluid pump driven by the airframe mounted accessory drive 12 by means of the fluid connection 46. In the first position, the end of the radially inward extending rod 54 is forced radially outward to the first position at which the outer surface 58 is free to axially move in either direction past the radially inward end of the rod 54. The piston has a radially outward extending pin 62 which functions as a visual indicator to signal that the movable carrier 20 and driven shaft 22 are not in the locked first or second positions. When pressurized fluid is applied from the pump of the airframe mounted accessory drive 12 by the fluid connection 46 to the bore 48, fluid pressure on the top radially outward surface 64 of the piston 52 forces the piston downward against the bias of the spring 60 applied to the bottom surface 66 of the piston 52 to position the piston as illustrated.

FIG. 2A illustrates a top view of the interlock 44 in which the radially outward extending pin 62 of the piston 52 is illustrated. When the pin 62 projects above the cover plate 50, ground personnel can readily visually determine that the movable carrier 20 and driven shaft 22 are not locked in the first or second position by pressurized fluid generated by the pump in the airframe mounted accessory drive 12. As indicated above, the safety interlock 44 prevents the disconnection of the rotatable shaft 18 from the driven shaft 22 when the airframe mounted accessory drive is operating during flight and further prevents the accidental engagement of the stationary driven shaft 22 with the rotating shaft 18 during powering of the airframe mounted accessory 12 by the auxiliary power unit 21 in testing on board power generation equipment.

Figure 3:
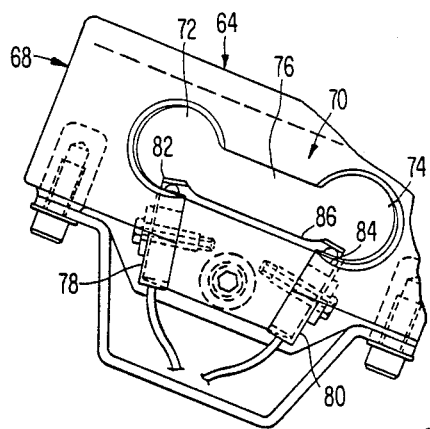
FIG. 3 illustrates a sectional view of FIG. 2.

The locking mechanism and position sensor 63 is described in detail with reference to FIGS. 2 and 3. The locking mechanism and position sensor 63 is attached to the support bracket 40 by a suitable fastener 66. A lock plate 68 contains an opening 70 which is comprised of first and second arcuate portions 72 and 74 respectively which are joined together by an intermediate connecting section 76. The width of the intermediate section 76 is less than the diameter of the arcuate portions 72 and 74 which permits the outer cylindrical section 32 to be retained in the first arcuate portion 72 or the second arcuate portions 74 when the handle 30 is released. When the outer cylindrical section 32 is pulled axially away from the shaft 33, the reduced diameter portion 77 will pass through the width of the intermediate section 76 to permit pivoting of the handle 30 between the first and second positions. However, when the handle 30 is released, the larger diameter section 80 of the outer cylindrical section 32 is retained in the first or second arcuate portions 72 and 74 to positively lock the handle. First and second switches 78 and 80 are respectively mounted adjacent the first arcuate portion 72 and the second arcuate portion 74 to permit sensing of the handle 30 being locked in either of the first or second positions or being disposed in the intermediate position. When the handle 30 is positioned in either the first or the second locked positions, the contacts 82 and 84, respectively of the first and second switches are closed to cause the switch to have a first conductivity state in which electrical current may flow between terminals thereof (not illustrated). Accordingly, the handle position indicator 38 signals that the handle 30 is in the first position when contact 82 is closed, signals that the handle is in the second position when contact 84 is closed, and signals that the handle is in an intermediate position when neither of the contacts 82 and 84 are closed by the reduced diameter cylindrical section 77.

Figure 4:
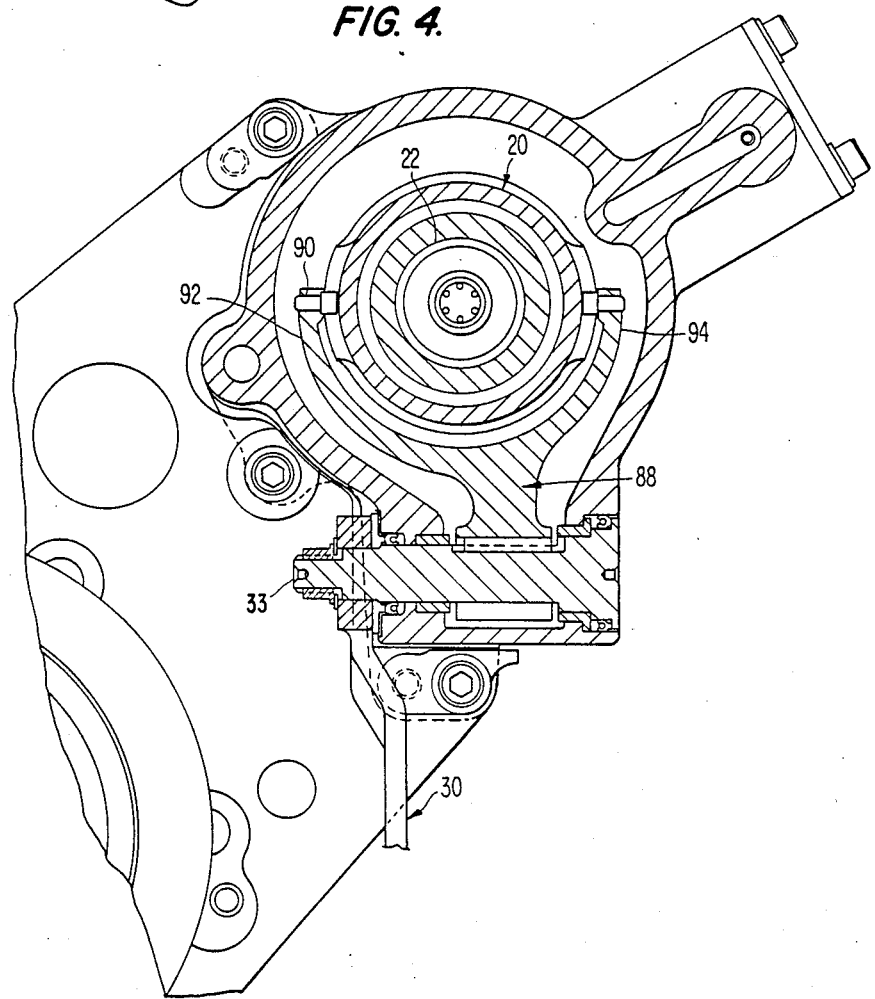
FIG. 4 illustrates a sectional view of FIG. 2.
Figure 5:
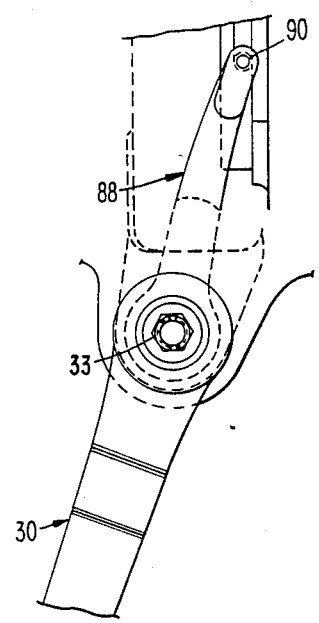
FIG. 5 illustrates an elevational view illustrating a shifting fork of FIG. 4.

FIGS. 4 and 5 illustrate the shifting fork 88 which rotates between first and second positions in response to movement of the handle 30 between the first and second positions. A first end of the fork 88 is connected to the shaft 33 by a mechanical connection such as a splined joint. The second end of the fork 88 is bifurcated and has connectors 90 attached to the outer diameter of the carriage. As is apparent, rotation of the shaft 33 in response to movement of the handle 30 between the first and second positions causes the bifurcations 92 and 94 to rotate between first and second positions which axially translates the carrier 20 and driven shaft 22 between the first and second positions.

The foregoing mechanical linkage for translating the driven shaft 22 between the first and second positions has the advantages of being less costly to manufacture than the prior art, has less mechanical backlash which permits a higher reliability of sensing of the first, and second locked positions and the intermediate position of the handle 30, provides a safety interlock with visual indication which prevents operation of the aircraft without the rotatable shaft 18 being decoupled from the driven shaft 22, and prevents movement of the driven shaft 22 from the first position to the second position during rotation of the rotatable shaft 18.

Figure 6A:
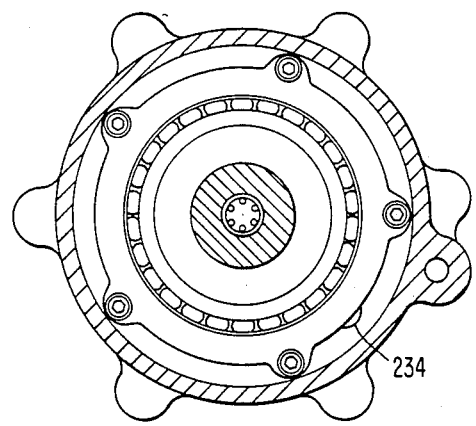
FIG. 6A illustrates a sectional view of FIG. 6.
Figure 6:
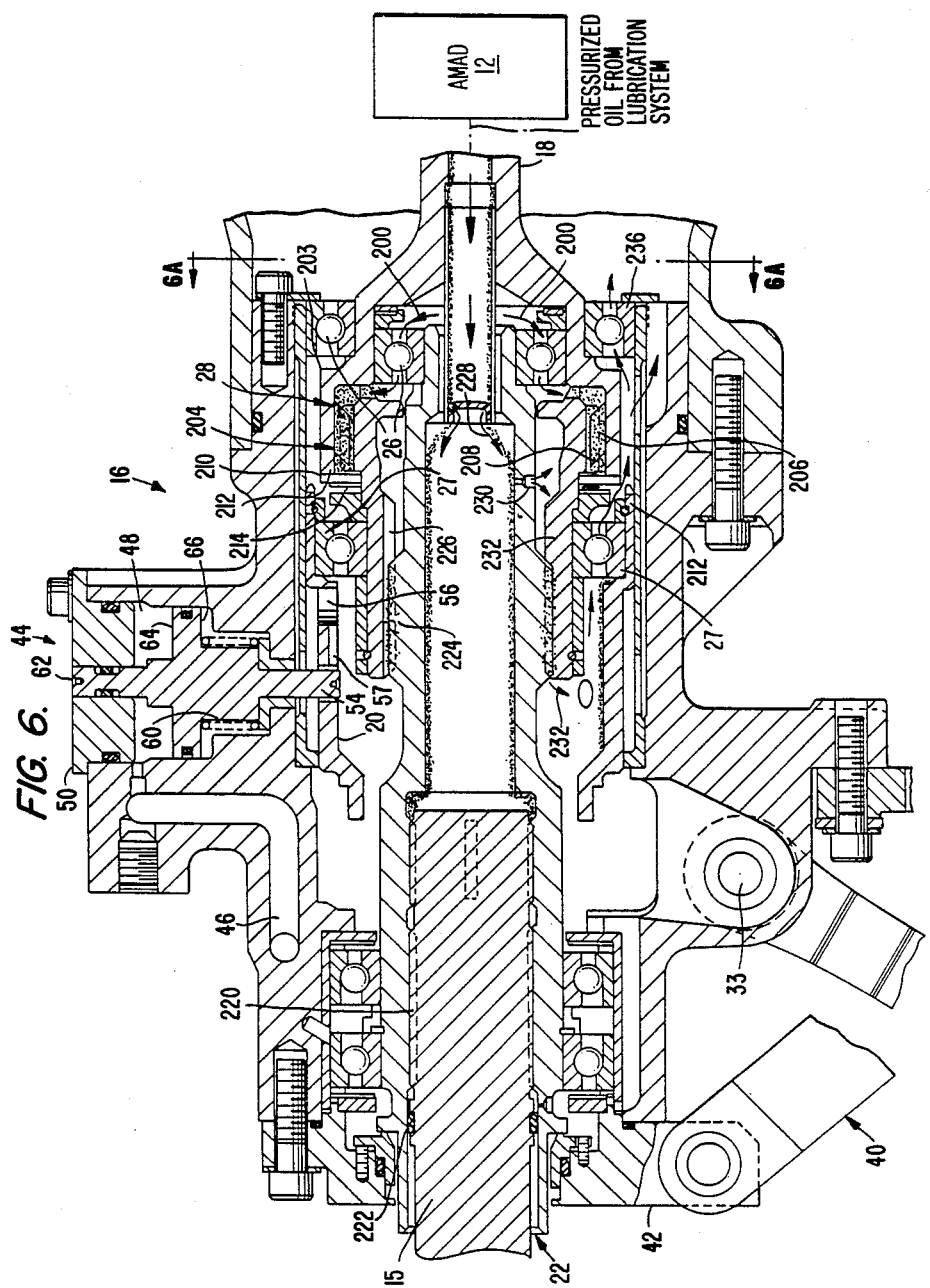
FIG. 6 illustrates a sectional view illustrating the lubricating system of the present invention.

A pressurized lubrication system illustrated in FIG. 6 is provided to maintain the connection 28 immersed in pressurized oil during application of power from the rotatable shaft 18 to the driven shaft 22 which can occur at speeds of 16,000 rpm or more. In FIG. 6, oil flow direction is indicated by arrows and the collection of volumes of oil to protect surfaces are indicated by stippled dark portions. It should be noted that the pressurized oil is provided by a conventional oil pump (not illustrated) that is associated with the AMAD 12. Without providing of pressurized lubrication to the splined joint of the mechanical connection 28, fretting of the mating surfaces of the rotatable shaft 18 and the driven shaft 22 could result when power is applied from the driven shaft to the rotating shaft at high rotational speeds which could lead to expensive repairs or outright failure. Pressurized oil is provided by the pressurized lubrication system of the AMAD 12 and flows axially with respect to and preferably through the center of shaft 18 to the left toward the splined joint of connection 28. As illustrated, oil flows axially to the left and radially outward at point 200 through inner bearing 26 to the connection 28. The end 203 of rotatable shaft 18 forms an annulus 204. The splined joint of the mechanical connection 28 is comprised of interior surface 206 of the annulus 204 having machined surfaces which cooperate with corresponding machined surfaces on the radially outward end portion of 208 of the rotatable shaft 22. An annular ring 210 is biased against the end 212 of shaft 18 to form a dam to retain pressurized oil within the volume defined by the mechanical connection 28 and the annular ring. A wave spring 214 biases the annular ring 210 against the end 212 of the rotatable shaft 18 to apply a predetermined axial pressure to retain pressurized oil within the mechanical connection 28 which helps prevent fretting which would be consequent from the application of torque from the driven shaft 22 to the rotatable shaft 18 at high rotational speeds such as those encountered by the power takeoff to drive an airframe mounted accessory drive in a jet aircraft. The stiffness of the wave spring 214 is chosen to maintain a desired amount of pressure within the volume of the mechanical connection. The high rotational speeds of the rotatable shaft 18 insure that the oil is centrifugally pressured in the volume of the mechanical connection when the annular ring 210 is axially biased against the end 212 of the driven shaft 18 by the wave spring 214,. Oil passing out of the volume of the mechanical connection 28 past wave spring 214 flows radially outward and through outer bearing 26, and also through aperture 234 illustrated in FIG. 6A to a sump of the AMAD 12 not illustrated.

The driven shaft 22 is splined to the PTO 15 by splines 220. An oil seal 222 prevents oil from moving axially to the left past the oil seal. The right-hand portion of driven shaft 22 has a splined connection 224 with section 226 which is immersed in oil. The oil flow to the splined connection 224 flows axially to the left as indicated at 228 to create an oil layer as indicated and further radially outward at port 230 to immerse the splined connection 224 in oil. The oil flows from the splined connection 224 axially to the left as indicated at point 232, radially outward axially to the right through bearing 27 and through the aperture 234 illustrated in FIG. 6A, and through the outer bearing 26 to the sump (not illustrated) of the lubrication pump.

While the foregoing invention has been described in terms of its preferred embodiment, it should be understood that numerous modifications may be made thereto without departing from the spirit an scope of the invention as defined in the appended claims. For example, while it is preferred that the decoupler system of the present invention be used for selectively connecting a propulsion engine to an airframe mounted accessory drive, it should be understood that the invention is not limited thereto and is applicable to other mechanical drives. It is intended that all such modifications fall within the scope of the appended claims.

We claim:

1. In jet aircraft having a drive which rotatably drives an airframe mounted accessory drive, a system for controlling the connection of the drive to the airframe mounted accessory drive comprising;
   a movable member which is pivotal at a pivot point between first and second positions;
   means for locking the movable member in the first and second positions;
   an axially movable carrier which is movable between first and second positions, the movable carrier carrying a shaft which is positioned in first and second axial positions respectively when the carrier is in the first and second axial positions, the shaft having a first end which is coupled to the airframe mounted accessory drive and a second end which is connectable to a shaft drive by a propulsion turbine of the aircraft when the carrier is in the first axial position and decoupled from the airframe mounted accessory drive when the carrier is in the second position, the first position of the movable member corresponding to the first position of the carrier and the second position of the movable member corresponding to the second position of the carrier and rotation of the movable member between the first and second positions causing axial movement of the carrier from the first axial position to the second axial position and axial movement of the shaft carried by the carrier from the first axial position to the second axial position;
a rotatably mounted shaft which is connected to the movable member at the pivot point;
a fork having a first end which is connected to the rotatably mounted shaft and a second end which is connected to the carrier with rotation of the shaft causing the fork to rate between first and second rotary positions which correspond to the first and second axial positions of the carrier;
a pump driven through the airframe mounted accessory drive to produce pressurized lubrication fluid in response to a rotational drive applied to the pump; and
movable locking means which is in fluid connection with the pump with the movable locking means being biased in a first position when pressurized lubrication fluid is not connected thereto and being positioned in a second position by pressurized lubrication fluid from the pump for locking the carrier in either the first or second position as long as the pressurized fluid is connected to the movable locking means.

2. A system in accordance with claim 1 wherein:
the carrier has first and second apertures respectively corresponding to the first and second positions of the carrier, when in the second position the locking means engages either the first aperture when the carrier is locked in the first position or the second aperture when the carrier is locked in the second position to prevent shifting of the shaft carried by the carrier.

3. A system in accordance with claim 2 wherein the locking means comprises:
a cylindrical bore in a housing which projects inward toward the carrier;
a piston disposed in the bore;
a cover sealing an opening in the cylindrical bore;
means for coupling pressurized fluid to the bore at a position outward from a top surface of the piston; and
a spring disposed in the bore and engaging a bottom surface of the piston to position the movable locking means in the first position when pressurized fluid is not coupled to the bore.

4. A system in accordance with claim 1 further comprising:
position detecting means for detecting the first and second positions of the movable member and signalling at least when the movable member is in the first position and when the movable member is in the second position.

5. A system in accordance with claim 4 wherein the position detecting means comprises:
(a) a first switch mounted adjacent the first position of the movable member which engages the movable member when the movable member is in the first position to cause the first switch to be in a first conductivity state and is in a second conductivity state when the movable member is not in the first position; and
(b) a second switch mounted adjacent the second position of the movable member when the movable member is in the second position to cause the second switch to be in a first conductivity state and is in a second conductivity state when the movable member is not in the second position.

6. A system in accordance with claim 5 wherein:
the position detecting means further signals in response to the first and second switches being in the second conductivity state that the movable member is in a position intermediate the first and second positions of the movable member.

7. A system in accordance with claim 6 wherein:
the first conductivity state of the first and second switches permits electrical current to flow between terminals of the switches and the second conductivity state of the switches blocks the flow of electrical current through the terminals of the switches.

8. A system in accordance with claim 1 wherein the means for locking the movable member in the first and second positions comprises:
an opening which engages the movable member to permit pivoting of the movable member between the first and second positions, the opening having two sections which are connected by a connecting section, the two sections having a dimension parallel to a width of the connecting section which is greater than the width; and
a handle mounted on the movable member which is axially movable between a first position at which the handle is biased to a second position, the first position of the handle engaging one of the two sections of the opening when the movable member is in one of the first and second positions of the movable member to lock the movable member from rotation to the other of the first and second positions of the movable member, and the second position of the movable member permitting rotation of the movable member between the first and second positions of the movable member.

9. In jet aircraft having a drive which rotatably drives an airframe mounted accessory drive, a system for controlling the connection of the drive to the airframe mounted accessory drive comprising:
a movable member which is pivotal at a pivot point between first and second positions;
means for locking the movable member in the first and second positions;
an axially movable carrier which is movable between first and second positions, the movable carrier carrying a shaft which is positioned in first and second axial positions respectively when the carrier is in the first and second axial positions, the shaft having a first end which is coupled to the airframe mounted accessory drive and a second end which is connectable to a shaft driven by a propulsion turbine of the aircraft when the carrier is in the first axial position and decoupled from the airframe mounted accessory drive when the carrier is in the second position, the first position of the movable member corresponding to the first position of the carrier and the second position of the movable member corresponding to the second position of the carrier and rotation of the movable member between the first and second positions causing axial movement of the carrier from the first axial position to the second axial position and axial movement of the shaft carried by the carrier from the first axial position to the second axial position;
a rotatably mounted shaft which is connected to the movable member at the pivot point;
a fork having a first end which is connected to the rotatably mounted shaft and a second end which is connected to the carrier with rotation of the shaft causing the fork to rate between first and second rotary positions which correspond to the first and second axial positions of the carrier;

a pump driven through the airframe mounted accessory drive to produce pressurized fluid in response to a rotational drive applied to the pump; and movable locking means which is in fluid connection with the pump with the movable locking means being biased in a first position when pressurized fluid is not connected thereto and being positioned in a second position by pressurized fluid from the pump for locking the carrier in either the first or second position as long as the pressurized fluid is connected to the movable locking means; wherein the carrier has first and second apertures respectively corresponding to the first and second positions of the carrier, when in the second position the locking means engages either the first aperture when the carrier is locked in the first position or the second aperture when the carrier is locked in the second position to prevent shifting of the shaft carried by the carrier; wherein the locking means comprises:

a cylindrical bore in a housing which projects inward toward the carrier;

a piston disposed in the bore;

a cover sealing an opening in the cylindrical bore;

means for coupling pressurized fluid to the bore at a position outward from a top surface of the piston; and a spring disposed in the bore and engaging a bottom surface of the piston to position the movable locking means in the first position when pressurized fluid in not coupled to the bore; and wherein:

the piston is attached to a rod with the rod activating an indication means to signal that the carrier is not in the locked first or second positions.

10. A system in accordance with claim 9 wherein the indicating means comprises:

said rod is connected to the piston and engages a bore extending through the cover, the rod projecting above a top surface of the cover when the carrier is not in the locked first or second positions.

11. A system in accordance with claim 10 further comprising:

position detecting means for detecting the first and second positions of the movable member and signalling at least when the movable member is in the first position and when the movable member is in the second position.

12. A system in accordance with claim 11 wherein the position detecting means comprises:

(a) a first switch mounted adjacent the first position of the movable member which engages the movable member when the movable member is in the first position to cause the first switch to be in a first conductivity state and is in a second conductivity state when the movable member is not in the first position; and (b) a second switch mounted adjacent the second position of the movable member when the movable member is in the second position to cause the second switch to be in a first conductivity state and is in a second conductivity state when the movable member is not in the second position.

13. A system in accordance with claim 12 wherein:

the position detecting means further signals in response to the first and second switches being in the second conductivity state that the movable member is in a position intermediate the first and second positions of the movable member.

14. A system in accordance with claim 13 wherein:

the first conductivity state of the first and second switches permits electrical current to flow between terminals of the switches and the second conductivity state of the switches blocks the flow of electrical current through the terminals of the switches.

15. A system in accordance with claim 14 wherein the means for locking the movable member in the first and second positions comprises:

an opening which engages the movable member to permit pivoting of the movable member between the first and second positions, the opening having two sections which are connected by a connecting section, the two sections having a dimension parallel to a width of the connecting section which is greater than the width; and a handle mounted on the movable member which is axially movable between a first position at which the handle is biased to a second position, the first position of the handle engaging one of the two sections of the opening when the movable member is one of the first and second positions of the movable member to lock the movable member from rotation to the other of the first and second positions of the movable member, and the second position of the movable member permitting rotation of the movable member between the first and second positions of the movable member.

16. A drive which rotatably drives a driven device, a system for controlling the connection of the drive to the drive device comprising:

a handle which is pivotal at a pivot point between first and second positions;

means for locking the handle in each of the first and second positions;

an axially movable carrier which is movable between first and second positions, the movable carrier carrying as shaft which is positioned in first and second axial positions respectively when the carrier is in the first and second axial positions, the shaft having a first end which is coupled to an airframe mounted accessory drive and a second end which is connectable to a shaft driven by a propulsion turbine of an aircraft when the carrier is in the first axial position and decoupled from the airframe mounted accessory drive when the carrier is in the second position, the first position of the handle corresponding to the second position of the carrier and rotation of the handle between the first and second positions causing axial movement of the carrier from the first axial position to the second axial position and axial movement of the shaft carried by the carrier from the first axial position to the second axial position;

a rotatably mounted shaft which is connected to the handle of the pivot point;

a fork having a first end which is connected to the rotatably mounted shaft and a second end which is connected to the carrier with rotation of the shaft causing the fork to rotate between first and second axial positions of the carrier;

wherein the means for locking the handle in the first and second positions comprises;

an opening which engage the handle to permit pivoting of the handle between the first and second positions, the opening having two sections which are connected by a connecting section, the two sections having a dimension parallel to a width of the connecting section which is greater than the width; and wherein the handle is mounted so as to be axially movable between a first position at which the handle is biased to a second position, the first position of the handle engaging one of the two sections of the opening when the handle is in one of the first and second positions of the handle to lock the handle from rotation to the other of the first and second position of the movable member, and the second position of the handle permitting rotation of the handle between the first and second positions of the handle; and position detecting means in each of the two sections of said opening for detecting means in each of the two sections of said opening for detecting when the handle is locked in said first position and when the handle is locked is said second position.

* * * * *